UNITED STATES PATENT OFFICE.

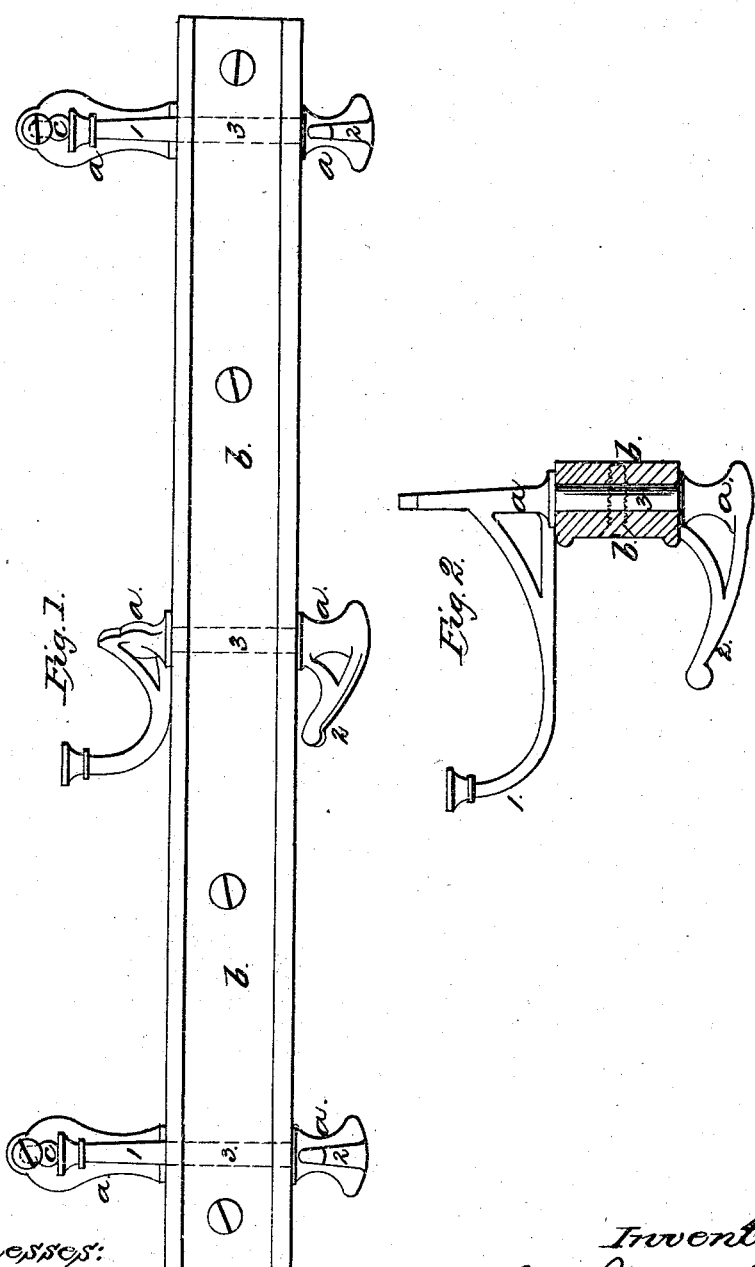

ALEXANDER J. WALKER, OF NEW YORK, N. Y.

IMPROVED CLOTHES-HANGER.

Specification forming part of Letters Patent No. 43,144, dated June 14, 1864.

*To all whom it may concern:*

Be it known that I, ALEXANDER J. WALKER, of the city and State of New York, have invented, made, and applied to use a certain new and useful Improvement in Clothes-Hanging Apparatus; and I do hereby declare the following to be a full, clear, and exact description of the same, reference being had to the annexed drawings, making part of this specification, wherein—

Figure 1 is an elevation of said rack. Fig. 2 is an end view of the same.

Similar marks of reference denote the same parts.

Hooks for hanging garments on have heretofore been fitted to turn horizontally upon a vertical axis or support, as in Letters Patent granted to John B. Wickersham, June 2, 1857, and reissued March 8, 1864.

The nature of my said invention consists in a series of horizontally-turning hooks with arms above and below a supporting-bar, and in the combination therewith of sustaining-eyes, whereby a portable, light, compact, strong, and cheap clothes-hanging apparatus is produced that can easily be hung up for use on nails or screws and quickly taken down when desirable to remove it, and which can also be reduced to a small compass, when wishing to pack or transport the same, by turning the hooks so that they are in line with each other and with the sustaining-bar.

In the drawings, $a\ a$ are hooks provided with the arms 1 1 above and the arms 2 2 below the sustaining-bar $b$. The round axis or upright portion 3 of the hook passes through a hole made crosswise in said bar at right angle to its length. The said bar may be of wood or other material. If the hook, including the upper and lower arms, 1 and 2, is made in one piece, the bar $b$ must be divided longitudinally in order that the portion 3 of the hook may be received into half-circle grooves across the contiguous inner faces of said divided bar, and then the halves of said bar are united by gluing, screwing, or otherwise. If desired, the bar may be made solid and grooves cut across the face and then the hooks kept in place by small metal bands, and these might perhaps be used without cutting the groove in the bar at all.

Another way of using a solid bar would be to have the hooks made with one of the arms detachable, so that the rounded axis of the hook could be passed directly through a hole in the bar and then the arm secured in place by means of a nut or pin. Upon the upper ends of two or more of the hooks $a$ eyes $c\ c$ are formed, by which the rack or clothes-hanger may be sustained upon nails or screws. If desired to have less leverage on the sustaining nail or screw, the upright part of the hooks in which the eyes are placed may be lengthened and in that case said part might be jointed, so that when not in use it could be folded down lengthwise of the bar, and so be more compact.

This apparatus is cheap, light, strong, portable, and easily hung up and taken down, and when not in use the hooks may be turned to coincide with the bar $b$, and so take up but little room and be easily packed for transportation, making it a very useful article for families, travelers, and others.

In consequence of using only one bar with the turning-hooks above and below it, my clothes-hanging apparatus is much stronger than those devices which have a frame for holding the hooks and in which the weight of garments tends to separate the parts of the frame at the joints.

I do not claim wardrobe-hooks which may be turned around horizontally, the same being set forth in the patent of John B. Wickersham, of June 2, 1857, and reissued March 8, 1864; but

What I claim, and desire to secure by Letters Patent as an improvement on the aforesaid patent, is—

A series of horizontally-turning hooks with arms above and below a supporting bar or strip, substantially as specified, and in combination therewith the eyes $c\ c$, for the purposes and as specified.

In witness whereof I have hereunto set my signature this 8th day of April, 1864.

ALEX. J. WALKER.

Witnesses:
THOS. GEO. HAROLD,
CHAS. H. SMITH.